US007613228B2

(12) United States Patent
Niedzwiecki

(10) Patent No.: US 7,613,228 B2
(45) Date of Patent: Nov. 3, 2009

(54) M-ALGORITHM MULTIUSER DETECTOR WITH CORRELATION BASED PRUNING

(75) Inventor: Joshua D Niedzwiecki, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 355 days.

(21) Appl. No.: 11/463,877

(22) Filed: Aug. 10, 2006

(65) Prior Publication Data
US 2007/0036250 A1  Feb. 15, 2007

Related U.S. Application Data

(60) Provisional application No. 60/706,989, filed on Aug. 10, 2005.

(51) Int. Cl.
*H04B 1/00* (2006.01)
(52) U.S. Cl. ............... 375/144; 375/148; 375/150; 375/152; 375/341; 375/346
(58) Field of Classification Search ......... 375/142–144, 375/147, 148, 150, 152, 340, 341, 346
See application file for complete search history.

(56) References Cited

U.S. PATENT DOCUMENTS

| 4,821,290 | A | 4/1989 | Hingorani et al. |
| 5,371,471 | A | 12/1994 | Chennakeshu et al. |
| 5,506,861 | A | 4/1996 | Bottomley |
| 5,569,439 | A | 10/1996 | Cardini et al. |
| 5,790,606 | A | 8/1998 | Dent |
| 5,867,478 | A | 2/1999 | Baum et al. |
| 5,921,937 | A | 7/1999 | Davis et al. |
| 5,966,262 | A | 10/1999 | Brickner et al. |
| 5,982,813 | A | 11/1999 | Dutta et al. |
| 5,999,899 | A | 12/1999 | Robinson |
| 6,011,812 | A | 1/2000 | Laakso |
| 6,122,269 | A | 9/2000 | Wales |
| 6,144,710 | A | 11/2000 | Chen et al. |

(Continued)

OTHER PUBLICATIONS

Varanasi, "Decision Feedback Multiuser Detection: A Systematic Approach", IEEE Transactions on Information Theory, Jan. 1999, vol. 45.

(Continued)

*Primary Examiner*—David B Lugo
(74) *Attorney, Agent, or Firm*—Vern Maine & Associates; Andrew P. Cernota; Daniel J. Long

(57) ABSTRACT

A multiuser detector system with correlation based pruning including a parameter estimation module adapted to receive complex signals, and to produce estimated signature waveforms for each of K co-channel interfering signals. Pre-processing the estimated signature waveforms using an S-matrix module and producing a more valid set of hypotheses, wherein the S-matrix module uses apriori knowledge of an unnormalized cross correlation matrix, and processing the more valid set of hypotheses for pruning with an M-algorithm in a multiuser detector module. An improvement to the M-algorithm in which the interference structure based on the signal correlation matrix used during the optimization process aids in selecting a better subset of hypotheses to test. This approach has the benefit of reducing computational complexity and improving performance over the existing M-algorithm.

21 Claims, 13 Drawing Sheets

S-Matrix Sorter

U.S. PATENT DOCUMENTS

| | | | |
|---|---|---|---|
| 6,172,970 | B1 | 1/2001 | Ling et al. |
| 6,198,775 | B1 | 3/2001 | Khayrallah et al. |
| 6,219,341 | B1 | 4/2001 | Varanasi |
| 6,282,300 | B1 | 8/2001 | Bloom et al. |
| 6,307,892 | B1 | 10/2001 | Jones et al. |
| 6,366,624 | B1 * | 4/2002 | Balachandran et al. ...... 375/341 |
| 6,377,611 | B1 | 4/2002 | Hwang |
| 6,448,923 | B1 | 9/2002 | Zrnic et al. |
| 6,466,566 | B1 | 10/2002 | De Gaudenzi et al. |
| 6,490,327 | B1 | 12/2002 | Shah |
| 6,535,554 | B1 | 3/2003 | Webster et al. |
| 6,654,365 | B1 | 11/2003 | Sylvester et al. |
| 6,704,376 | B2 | 3/2004 | Mills et al. |
| 6,831,574 | B1 | 12/2004 | Mills et al. |
| 6,839,390 | B2 | 1/2005 | Mills |
| 6,839,573 | B1 | 1/2005 | Youssefmir et al. |
| 6,862,326 | B1 | 3/2005 | Eran et al. |
| 6,947,505 | B2 | 9/2005 | Learned |
| 6,947,506 | B2 | 9/2005 | Mills |
| 6,967,598 | B2 | 11/2005 | Mills |
| 6,981,203 | B2 | 12/2005 | Mills |
| 6,999,498 | B2 | 2/2006 | Mills et al. |
| 7,031,284 | B2 | 4/2006 | Supplee et al. |
| 7,058,422 | B2 | 6/2006 | Learned et al. |
| 7,092,452 | B2 | 8/2006 | Taylor et al. |
| 2002/0013164 | A1 | 1/2002 | Leifer et al. |
| 2002/0110206 | A1 | 8/2002 | Becker et al. |
| 2002/0114410 | A1 | 8/2002 | Brunel |
| 2003/0108192 | A1 | 6/2003 | Tanrikulu et al. |
| 2003/0152175 | A1 | 8/2003 | Kuki et al. |
| 2003/0161416 | A1 | 8/2003 | Meyer et al. |
| 2004/0013205 | A1 | 1/2004 | Brunel |
| 2004/0017863 | A1 | 1/2004 | Learned |
| 2004/0022335 | A1 | 2/2004 | Arslan et al. |
| 2004/0213360 | A1 | 10/2004 | McElwain |
| 2005/0195790 | A1 | 9/2005 | Learned et al. |
| 2006/0115026 | A1 | 6/2006 | MacLeod |

OTHER PUBLICATIONS

J.B. Anderson and S. Mohan, "Sequential Coding Algorithms: A Survey and Cost Analysis", IEEE Trans. Commun., Feb. 1984, pp. 169-176, vol. Com-32.
Poor, H. Vincent, "Turbo Multiuser Detection: An Overview", IEEE 6th Int. Symp. On Spread-Spectrum Tech. & Appli., Sep. 6-8, 2000, pp. 583-587, NJIT, New Jersey.
Robertson, Patrick et al., "A Comparison of Optimal and Sub-Optimal MAP Decoding Algoritms Operating in the Log Domain", IEEE, 1995, pp. 1009-1013.
Hagenauer, Joachim et al., "A Viterbi Algorithm with Soft-Decision Outputs and its Applications", IEEE, 1989, pp. 1680-1686.
Pottie, Gregory J et al., "A Comparison of Reduced Complexity Decoding Algorithms for Trellis Codes", IEEE Journal on Selected Areas in Communications, Dec. 1989, pp. 1369-1380, vol. 7, No. 9.
Berrou, Claude et al., "Near Shannon Limit Error-Correcting Coding and Decoding: Turbo-Codes (1)", IEEE, 1993, pp. 1064-1070.
Berrou, Claude et al., "Near Optimum Error Correcting Coding and Decoding: Turbo-Codes", IEEE Transactions on Communications, Oct. 1996, pp. 1261-1271, vol. 44, No. 10.
Wang, Duanyi et al., "Low-Complexity MAP Decoding for Turbo Codes", IEEE, 2000, pp. 1035-1039.
Wang, Xiadong et al., "Iterative (Turbo) Soft Interference Cancellation and Decoding for Coded CDMA", IEEE Transactions on Communications, Jul. 1999, pp. 1046-1061, vol. 47, No. 7.
Wei, Lei et al., "Near Optimum Tree-Search Detection Schemes for Bit-Synchronous Multiuser CDMA Systems over Gaussian and Two-Path Rayleigh-Fading Channels", IEEE Transactions on Communications, Jun. 1997, pp. 691-700, vol. 45, No. 6.
Schlegel, Christian B. et al., "Performance/Complexity Issues in Multi-User CDMA Systems", IEEE, 1995, pp. 494-498.
Reed, Mark C. et al., "Reduced Complexity Iterative Multi-User Detection for DS/CDMA with FEC", IEEE, 1997, pp. 10-14.
Alexander, Paul, D., "Iterative Multiuser Interference Reduction: Turbo CDMA", IEEE Transactions on Communications, Jul. 1999, pp. 1008-1014, vol. 47, No. 7.
Verdu, Sergio, "Minimum Probability of Error for Asynchronous Gaussian Multiple-Access Channels", IEEE Transactions on Information Theory, Jan. 1986, pp. 85-96, vol. IT-32, No. 1.
Lupas, Ruxandra, "Linear Multiuser Detectors for Synchronous Code-Division Multiple-Access Channels", IEEE Transactions on Information Theory, Jan. 1989, pp. 123-136, vol. 35, No. 1.
Lupas, Ruxandra, "Near-Far Resistance of Multiuser Detectors in Asynchronous Channels", IEEE Transactions on Communications, Apr. 1990, pp. 496-508, vol. 38, No. 4.
Varanasi, Mahesh, K., "Near-Optimum Detection Synchronous Code-Division Multiple-Access Systems", IEEE Transactions on Communications, May 1991, pp. 725-736, vol. 39, No. 5.
Duel-Hallen, Alexandra, "Decorrelating Decision-Feedback Multiuser Detector for Synchronous Code-Division Multi-Access Channel", IEEE Transactions on Communications, Feb. 1993, pp. 285-290, vol. 41, No. 2.
Wei, Lei, "Synchronous DS-SSMA System with Improved Decorrelating Decision-Feedback Multiuser Detection", IEEE Transactions on Vehicular Technology, Aug. 1994, pp. 767-772, vol. 43, No. 3.
PCT International Search Report dated Jul. 11, 2003 of International Application No. PCT/US03/12917 filed Apr. 25, 2003.
Wang, Chin-Liang et al., "A Soft-Input Soft-Output Decorrelating Block Decision-Feedback Multiuser Detector for Turbo-Coded DS-CDMA Systems", Wireless Personal Communications, 2001, pp. 85-101, vol. 17, Kluwer Academic Publishers, Netherlands.
Fu, Hongyi, "Blind Channel and Carrier Offset Estimation in Multiuser CDMA", IEEE, 2002, pp. 21-25.
Wang, Xiaodong et al., "Turbo Multiuser Detection for Turbo-Coded CDMA", IEEE, 1999, pp. 1456-1460.
Rader, Charles M et al., "Hyperbolic Householder Transformations", IEEE Transactions on Acoustics, Speech, and Signal Processing, Dec. 1986, pp. 1589-1602, vol. ASSP-34, No. 6.
Alexander, Paul D. et al., "On the Windowed Cholesky Factorization of the Time-Varying Asynchronous CDMA Channel", IEEE Transactions on Communications, Jun. 1998, pp. 735-737, vol. 46, No. 6.
Simmons, Stanley J., "Breadth-First Trellis Decoding with Adaptive Effort", IEEE Transactions on Communications, Jan. 1990, pp. 3-12, vol. 38, No. 1.
Duel-Hallen, Alexandra, "Performance of Multiuser Zero-Forcing and MMSE Decision-Feedback Detectors for CDMA Channels", IEEE, 1993, pp. 82-86.
PCT Search Report dated Mar. 27, 2008 of Patent Application No. PCT/US06/60466 filed Nov. 2, 2006.

* cited by examiner

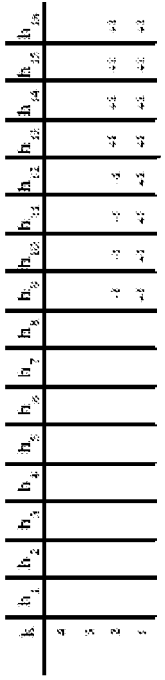
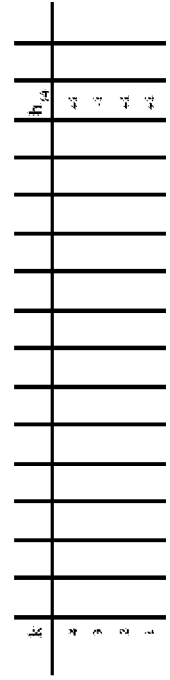
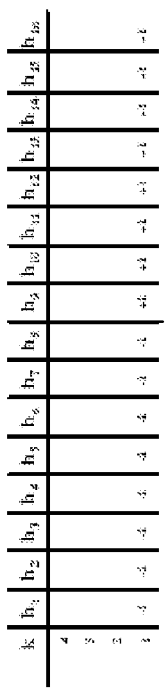

Turbo-MUD Demodulator

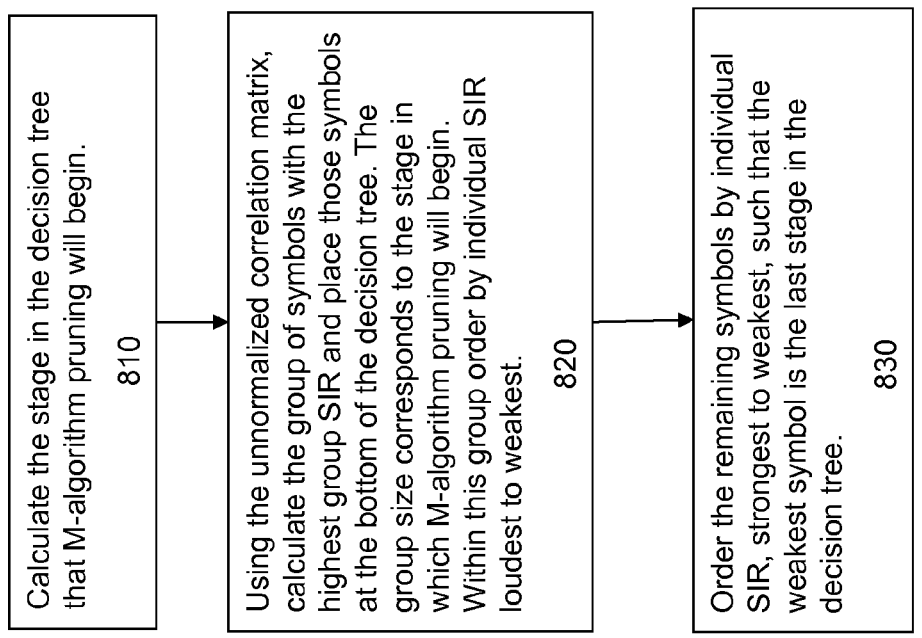

Desired bit error rate (BER) → $10 Log_{10}(Q^{-1}(BER))$ 1010 → SIR Threshold in dB ($\tau$)

SIR Threshold Calculator Embodiment

Figure 10

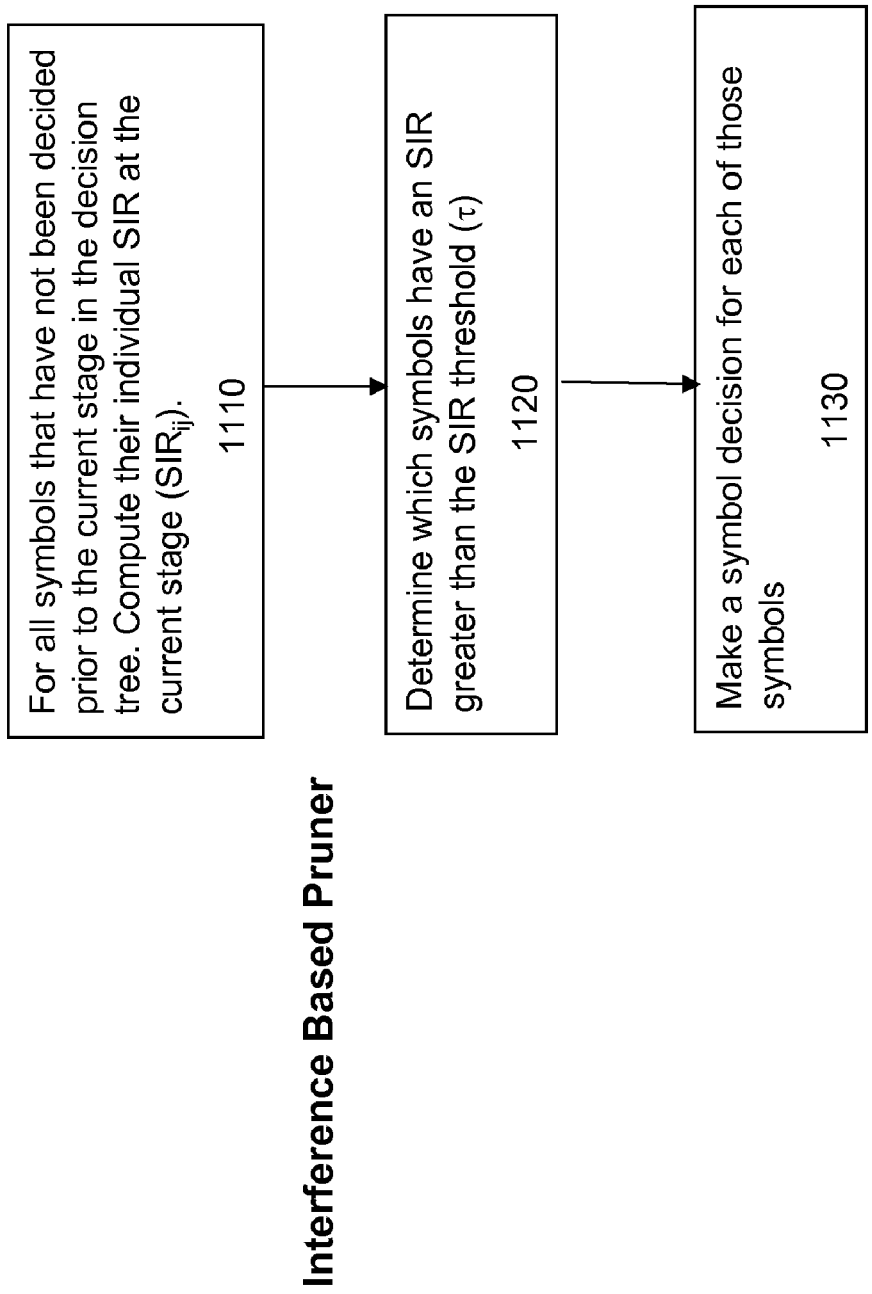

M-ALGORITHM MULTIUSER DETECTOR WITH CORRELATION BASED PRUNING

RELATED APPLICATIONS

This application claims the benefit of U.S. Provisional Application No. 60/706,989, filed Aug. 10, 2005 which is herein incorporated in its entirety by reference. This application is also related to U.S. application Ser. No. 10/423,740 entitled "Co-Channel Interference Receiver" filed Apr. 25, 2003 and to U.S. application Ser. No. 10/423,655 entitled "Deferred Decorrelating Decision-feedback Detector for Supersaturated Communications" filed on Apr. 25, 2003, both of which are herein incorporated by reference.

FIELD OF THE INVENTION

The invention relates to multiuser detection of signals and interference based pruning.

BACKGROUND OF THE INVENTION

As is well known, Multiuser detection (MUD) typically refers to the detection of data in non-orthogonal multiplexes, such as used to jointly demodulate co-channel interfering digital signals. MUD processing increases the number of information bits available per chip or signaling dimension for interference limited systems. Optimal MUD based on the maximum likelihood principle operates by comparing the received signal with the entire number of possibilities that may have occurred at the ensemble of transmitters to give rise to the waveform received at the receiver. The maximum likelihood detector is a brute force approach which requires an exhaustive search and consists of evaluating the Euclidean distance between the received samples and the linear model of the samples using every possible hypothesis of the bit sequence. For problems with a large number of users or severe intersymbol interference from multipaths, the maximum likelihood computations are complex and time-consuming, thus making real-time operation impractical or impossible.

Reduced complexity approaches based on conventional tree-pruning algorithms help to some extent, but the performance of such multiuser detection algorithms degrades as the parameter M (pruning factor) is decreased, since M governs the number of computations required. Thus, to combat "improper" pruning, basic tree-pruning must ensure that M is large enough so that an accurate result is generated. As a result, conventional pruning methods are still associated with increased complexity, particularly when the number of interfering signals is moderate to large.

And, the number of interfering signals continues to increase with advances in technology. Many communication systems today rely on multiple-access signal packing schemes where multiple signals occupy the same time and frequency channel. One major performance limitation in these types of systems is multiple-access interference where the correlation between the user's signature waveforms is non zero. In these cases, multiuser detection algorithms must be employed by the receiver to best mitigate this interference. Assuming the signal parameters for each user is known by the receiver, the maximum likelihood (ML) solution is to jointly search over every possible combination of each users transmit symbol sequence, then select the hypothesis that maximizes the likelihood function. As described, the problem with this approach is that it is computationally inefficient and may not be feasible for real time requirements.

Therefore, it is of interest to develop sub-optimal detectors that achieve near ML performance with less time and less complexity. One algorithm that somewhat reduces the complexity problem is the M-Algorithm, wherein only a fixed number of hypotheses, M, are tested based on interim metrics that are calculated at each stage in the decision tree to limit computation complexity. However, as noted herein, because the number of hypothesis to test each stage is fixed in the M-Algorithm, this technique by itself can still be inadequate, especially in a dynamic environment where the number of users and the interference environment is constantly changing.

What is needed therefore is a system and associated techniques for dynamically mitigating interference problems in a computationally efficient manner.

BRIEF SUMMARY

One embodiment of the invention is a multiuser detector system with correlation based pruning, having a parameter estimation module adapted to receive complex signals, and to produce estimated signature waveforms for each of K co-channel interfering signals. There is an S-matrix module forming an S-Matrix from the estimated signature waveforms, and a multiuser detector module processing the S-Matrix of the estimated signature waveforms with an unnormalized cross correlation matrix, and producing a more valid set of hypotheses for pruning with an M-algorithm.

A further embodiment includes the system wherein the multiuser detector module computes a signal to interference ration (SIR) for each symbol per stage, and wherein a decision is made at each stage if the SIR is greater than a pre-defined threshold. The SIR can be calculated for each symbol i at stage j, for $j \geq i$ by at least one of:

$$SIR_{ij} = 20\log\left(\frac{|h_{ii}|}{\sqrt{\sum_{n=j}^{K}|h_{in}|^2}}\right) \text{ and } SIR_{ik} = 20\log\left(\frac{|h_{ii}|}{\sqrt{\sum_{n \in D}|h_{in}|^2}}\right).$$

Furthermore, the predefined threshold ($\tau$) can be calculated as follows: $10\text{Log}_{10}(Q^{-1}(\text{BER}))$, BER is the desired bit error rate and $\tau$ is the SIR threshold in dB. A further feature includes where $\tau$ is used to control a computational complexity (CMCP), wherein the CMCP is bound by $\alpha QK \leq C_{MCP} \leq C_M$, wherein $C_M$ is the computational complexity of the M algorithm, $\alpha$ is the computational complexity of the filter, Q is the size of the symbol alphabet, and K is the number of users.

An additional aspect of the system further includes a front end whitening filter to pre-whiten the complex signals. The front end whitening filter to pre-whiten the complex signals, can include a matched filter bank adapted to prewhiten the complex signals, thereby partially decoupling users from multiple access interference, and a whitener designer module operatively coupled to the parameter estimator, and adapted to develop a model of each of the complex signals based on parameter estimates, and to compute a whitening filter bank that whitens filtered data output by the matched filter bank.

Another feature of the invention includes wherein the multiuser detector module outputs a set of coded symbols and further comprising an error correction decoder bank processing the set of coded symbols.

In another embodiment, the multiuser detector module can include a branch metric calculator, a signal to interference (SIR) threshold calculator, and a tree pruner. A further variation of the system includes wherein the complex signals provided to the multiuser detector module are buffered by a sampled waveform buffer.

A further aspect includes a turbo MUD adapted to provide estimates of individual symbols for each of the K co-channel interfering signals, wherein the estimates are iteratively applied in a feedback loop until a pre-defined condition is satisfied.

A further embodiment of the invention is a method for S-Matrix ordering for a decision tree including determining a stage in the decision tree for pruning, using an unnormalized correlation matrix, determining a group of symbols with a highest signal to interference ratio (SIR), placing the group with the highest SIR at a bottom of the decision tree, and ordering remaining symbols by individual SIR. The method can also include re-ordering the group of symbols by an individual SIR from loudest to weakest. Another feature of the method is wherein a size of the group corresponds to the stage for pruning in an M algorithm. The method also includes ordering of the remaining symbols by individual SIR from loudest to weakest such that a weakest symbol is in a last stage.

A further method includes calculating a next stage for pruning for a number of surviving branches at a current stage. In addition, locating a next group of symbols prior to pruning.

Yet another embodiment of the invention is a method for correlation based pruning for a set of stages 1-k, comprising defining a set of symbols containing symbols whose value was decided prior to stage k, in a current stage, determining indices of all current stage symbols, solving for a corresponding symbol set C whose elements contain all symbols to be decided in the current stage, and pruning using the M-algorithm pruning and keeping only top M symbol hypotheses out of all remaining hypotheses.

The method includes wherein the set of symbols can be defined by $P \in \{b_j\}_{j=1}^{k}$.

The method includes determining indices as defined by $i \in \{1, 2, \ldots, k\}$ such that $b_i \notin P$ and $SIR_{i,k} \geq \tau$.

The method also includes wherein solving is accomplished by summing over the stage metrics $\Phi_k$ for all combinations of symbols that must be estimated in future stages as follows:

$$\hat{C} = \arg \min_{C \in \{\pm 1\}^{N_C}} \sum_{l=1}^{L} \Phi_k(P, C, F_l)$$

where $F_l$ is the set containing the $l^{th}$ hypothesis of all remaining L symbols to be estimated in future stages such that $F_l \in \{\{b_j\}_{j=1}^{k} \notin \{P,C\}\}$.

BRIEF DESCRIPTION OF THE DRAWINGS

FIG. 3a shows an M-algorithm decision tree for stage 1 in accordance with one embodiment of the invention.

FIG. 3b shows an M-algorithm decision tree for stage 2 in accordance with one embodiment of the invention.

FIG. 3c shows an M-algorithm decision tree for stage 3 in accordance with one embodiment of the invention.

FIG. 3d shows an M-algorithm decision tree for stage 4 in accordance with one embodiment of the invention.

FIG. 8 is a flow chart used for determining the order that symbols should be placed in the decision tree in accordance with one embodiment of the invention.

FIG. 10 is a block diagram describing a method for calculating the SIR threshold in accordance with one embodiment of the invention.

FIG. 11a is a flow chart used for determining which symbols in the decision tree can be decided on during each stage in accordance with one embodiment of the invention.

DETAILED DESCRIPTION

In a general embodiment, the present invention describes a method for decreasing complexity in multiuser detector receivers by discarding some hypotheses based on the amount of correlation between paths in incremental decisions. The computational savings is realized by pruning a tree search algorithm at intermediate steps of the decision process. Metrics are proposed for determining if and when a branch should be pruned. In addition, a method for ordering users when solving the tree search is also described.

The term "signature waveform" as used herein denotes the impulse response of the channel through which the signal passes. The term "channel" as used herein includes not only the propagation channel and antenna effects, but also any filtering used in the transmitters and receiver. In addition, in a direct sequence spread spectrum system, it would also include the spreading code.

A MUD receiver jointly demodulates co-channel interfering digital signals. Multiuser detection systems take full advantage of all information available at the receiver by making use of any "knowledge" that the receiver has about the interfering signals. While computationally inefficient, the optimal Multiuser Detector is typically one that minimizes the mean square error between the received signal and all possible combinations of each users transmitted data symbols transformed by their unique signature response.

Figure 1:
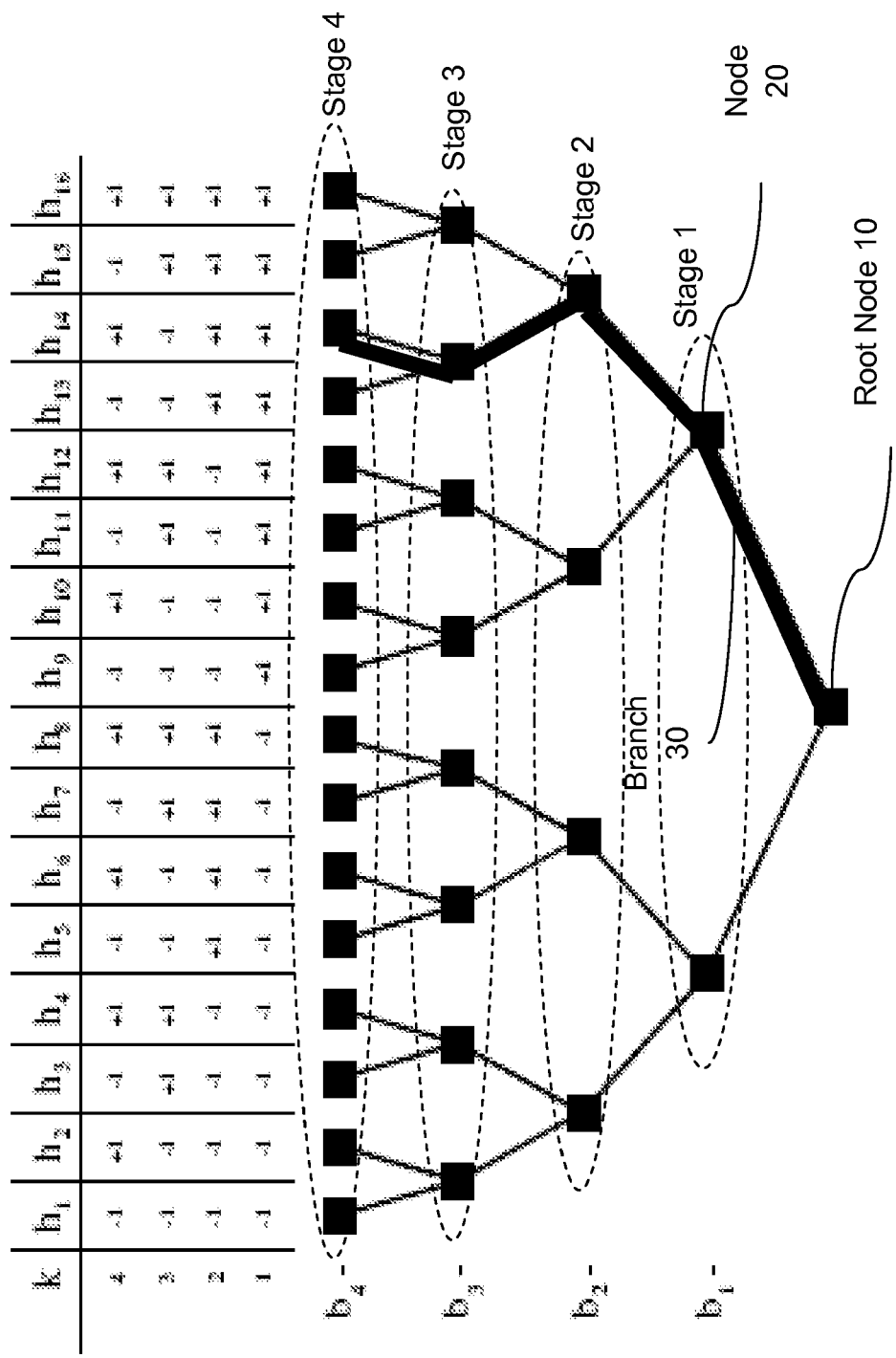
FIG. 1 is a prior art depiction of a maximum likelihood decision tree.

FIG. 1, shows an example of the maximum likelihood decision tree for a binary phase shift keying (BPSK) system where Q=2 and K=4. The root node 10 has branches 20 to other nodes 30, wherein each branch has a corresponding metric. In this case, obtaining the maximum likelihood solution requires testing 16 hypotheses ($h_1$-$h_{16}$), for each branch in the tree. By way of illustration, for a CDMA communication system where a given base station could expect to simultaneously receive 32 users, this results in a maximum likelihood decision tree where K=32 and requires testing of $2^{32} \approx 4 \times 10^9$.

For example, in a multiuser signal environment the general form of the complex base band signal model seen at the receiver is:

$$r = Sb + \omega$$

where r is the N×1 sampled complex baseband received signal vector, S is the N×K signature matrix where each column of S, denoted $s_k$, contains the complex baseband FIR channel impulse response for each symbol of each user contained in r, b is a K×1 vector containing the transmitted complex symbols for each user and $\omega$ is the N×1 AWGN where $\omega \sim C(0,\sigma^2 I)$.

Assuming that the signature matrix S is known, the multivariate Gaussian PDF of the received signal vector r given an unknown complex symbol vector b is defined as:

$$p(r, b) = \frac{1}{\pi^N \sigma^2} \exp\left\{-\frac{1}{\sigma^2}(r - Sb)^H (r - Sb)\right\}.$$

Based on this density function, the maximum likelihood (ML) estimator for b can be defined as:

$$\hat{b}_{ML} = \arg \min_{b \in \Psi^K} (r - Sb)^H (r - Sb)$$

where $\Psi^K$ is the K dimensional set of all possible symbol hypotheses. By expanding the objective function above and removing the constant $r^H r$ that is not a function of b, the ML estimator can be rewritten as:

$$\hat{b}_{ML} = \arg \min_{b \in \Psi^K} -2 Re\{b^H S^H r\} + b^H H b$$

where $H = S^H S$ is the K×K unnormalized signal correlation matrix whose elements $h_{ij}$ denote the unnormalized correlation between symbols i and j. Using this notation, the equation can be further expanded as:

$$\hat{b}_{ML} = \arg \min_{b \in \Psi^K} \sum_{k=1}^{K} \left(-2 Re\{b_k^* s_k^H r\} + h_{kk} |b_k|^2 + 2 \sum_{n=1}^{k-1} Re\{h_{kn} b_k^* b_n\}\right)$$

where $b_k$ denotes the $k^{th}$ element of b and * denotes the complex conjugate. The computational complexity of calculating the interference component of the maximum likelihood estimate for the complex symbol vector b requires testing all hypotheses which increases exponentially in the number of symbols. As described, such computations are computationally difficult and require time and considerable processing resources.

The computationally complexity of this ML estimator is defined as $$C_{ML} = \alpha Q K + \beta \sum_{k=1}^{K} Q^k (k-1)$$

where Q is the size of the symbol alphabet, $\alpha$ is the computational complexity of the match filter operation ($-2Re\{b_k^* s_k^H r\} + h_{kk} |b_k|^2$) and $\beta$ is the computational complexity of calculating the interference component ($2 h_{kn} Re\{b_k^* b_n\}$).

As noted, obtaining the maximum likelihood estimate for the complex symbol vector b requires testing all $Q^K$ hypotheses resulting in complexity that increases exponentially in the number of symbols making the problem NP complete. Thus, the ML MUD requires performing an exhaustive search over all possible combinations of bits for each user. And, this yield complexity grows exponentially with the number of users.

Even with current computing power, this problem is computationally complex and can not practically be solved in real time. Sub-optimal estimators have tried to approach maximum likelihood performance with lower complexity. One example is the M-algorithm, wherein the complexity is bounded by only searching a subset M of the total $Q^K$ hypotheses. This is accomplished by solving the maximum likelihood objective function in K stages and at each stage only keeping the top M hypotheses. This algorithm is implemented as follows, wherein at each stage k, the following metric is computed for a subset of hypotheses.

$$\Omega_k(b_1, \ldots, b_k) = -2 Re\{b_k^* s_k^H r\} + h_{kk} |b_k|^2 + 2 \sum_{n=1}^{k-1} Re\{h_{kn} b_k^* b_n\}$$

Notice, this metric is only a function of the first k symbols in b. The hypotheses tested at stage k are based on the top M hypotheses evaluated at stage k-1. For each surviving hypothesis, Q new hypotheses are created by adding an additional element and populating that element with all Q possible symbol combinations for symbol $b_k$. This results in a maximum of QM new hypotheses that are evaluated at each stage. Each of these new hypotheses are used to evaluate the stage metric at stage k and then used to compute a resultant metric based on the sum of all k stage metrics.

$$\Phi_k(b_1, \ldots, b_k) = \Omega_1(b_1) + \Omega_2(b_1, b_2) + \ldots + \Omega_k(b_1, \ldots, b_k)$$

This results in at most, QM values of $\Phi_k$ corresponding to each hypothesis tested. The best M hypotheses, resulting in the maximum $\Phi_k$, are stored and used in the following stage computation. This process is repeated for all K stages. At the end of the $K^{th}$ stage, the hypothesis in the set of remaining hypotheses which results in the maximum $\Phi_K$ defines the solution to b.

By way of illustration, consider the M-algorithm as a tree-pruning algorithm for a tree made up of nodes and branches. Each branch has a weight or metric, and a complete path is sequences of nodes connected by branches between the root of the tree and its branches. When applied as a short cut to the ML MUD, each branch weight is a function of the signature signal of a certain transmitter, the possible bit or symbol value associated with that transmitter at that point in time, and the actual received signal which includes all the signals from all the interfering transmissions. The weight of each path is the sum of the branch metrics in a complete path. The goal of a tree searching algorithm is to try to find the complete path through a tree with the lowest metric.

Referring to FIGS. 2a-2d, the decision tree propagation through the decision tree using the M-algorithm when Q=2, K=4 and M=3 is illustrated. The solid lines denote symbol hypotheses that survive 205 and dotted lines denote symbol hypotheses that were tested but did not survive and are pruned paths 210.

Figure 2B:
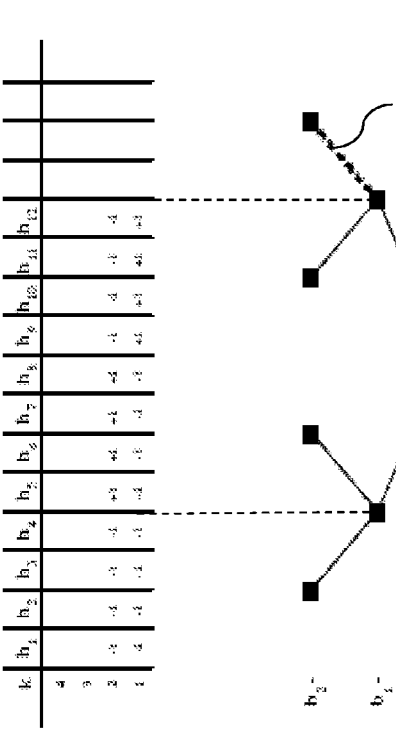
FIG. 2b shows a prior art M-algorithm decision tree for stage 2.
Figure 2D:
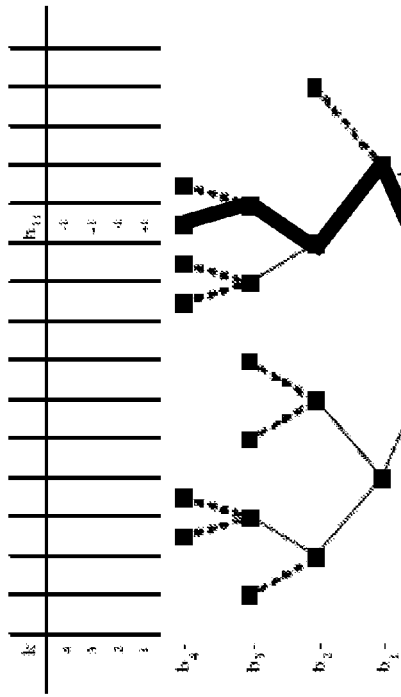
FIG. 2d shows a prior art M-algorithm decision tree for stage 4.
Figure 2A:
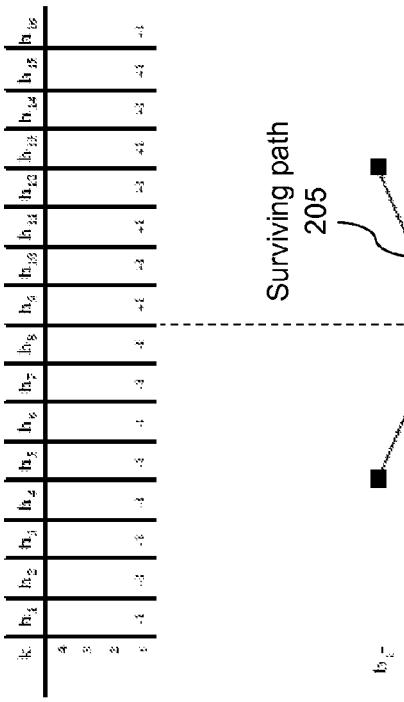
FIG. 2a shows a prior art M-algorithm decision tree for stage 1.

For example, FIG. 2a shows the beginning of the decision tree for the first hypothesis for stage 1 and the paths for symbol $b_1$. As shown in the accompanying table, for k=1, hypothesis values $h_1$-$h_8$ are '−1' and the hypothesis values $h_9$-$h_{16}$ are '+1'.

Figure 2C:
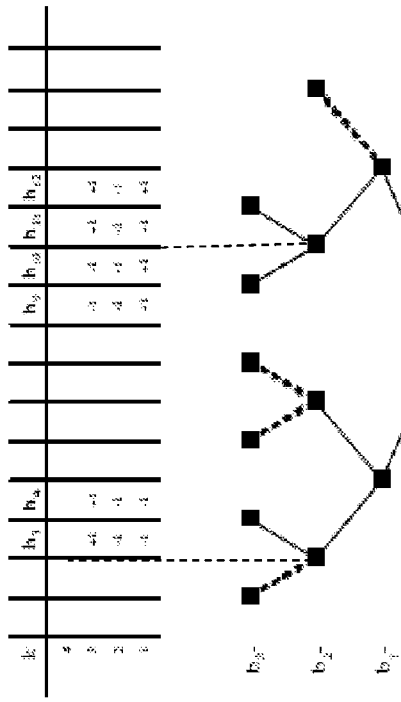
FIG. 2c shows a prior art M-algorithm decision tree for stage 3.

Referring to FIG. 2b, the 2nd stage of the decision tree is shown with k=2 and the corresponding hypothesis values for symbol $b_2$. As shown, one branch of the decision tree 210 has been pruned thereby simplifying subsequent processing As shown in FIG. 2c, the next stage for k=3 is solved for symbol combinations $b_3$, wherein further pruning is performed, leaving only three surviving paths. Finally, FIG. 2d shows the surviving path 220 with k=4 and the symbol combinations of $b_4$, wherein the hypothesis $h_{11}$ is the resultant surviving path representing the path with the lowest metric.

The M-Algorithm thus reduces computational complexity by pruning the decision tree. This is accomplished by searching the tree in stages and limiting the number of surviving branches to "M" at each stage, wherein the algorithm is highly reliant upon the size of "M". Performance is also a function of the ordering of the users in the tree, wherein the optimal ordering is typically to put the highest power, least correlated users at the bottom of the tree.

The major benefit to this algorithm is that the computational complexity is controlled by a single parameter, M. As M increases, the total number of hypotheses to test increases, increasing computationally complexity. This complexity is defined as $$C_M = \alpha QK + \beta \left[ \sum_{k=1}^{p} Q^k(k-1) + QM \sum_{k=p}^{K} (k-1) \right]$$

where p=floor(1+log M=log Q) is the lowest stage index at which $M<Q^p$. When $M=Q^K$, all possible hypotheses are tested resulting in the Maximum Likelihood solution.

However, one of the problems with the M Algorithm is that the search size is not dependent on the interference structure between users and unnecessary complexity is maintained in situations with less interference.

As is well known, the performance of the M-algorithm, for $M<<Q^K$, is highly dependant on the inter-symbol and inter-user interference. This interference is characterized by the unnormalized signal correlation matrix H which is either known or estimated by the receiver prior to demodulation. The metric computed at stage k is dependant on symbols $\{b_j\}_{j=1}^{k}$ where the influence of subset $\{b_j\}_{j=1}^{k-1}$, is determined by the signal cross correlations $\{h_{kj}\}_{j=1}^{k-1}$, respectively. The higher the cross correlation, the higher the influence that symbol has on the value of the current stage metric.

As previously described, with the M-algorithm, the decision tree is pruned at each stage such that only the "best" M hypotheses propagate to the next stage. However, this pruning process forces decisions for certain symbols before the final stage metric is computed. Thus, the estimate for those symbols is only maximum likelihood if they have no influence on stage metrics computed in later stages.

For example, if the value of symbol $b_i$ is decided at stage j where j≧i, the estimate for $b_i$ will only be maximum likelihood if the stage metrics $\{\Omega_{i+1}, \ldots, \Omega_K\}$ are not functions of $b_i$, which occurs only when $h_{in}$=0, for all n>i.

Because there is apriori knowledge of the unnormalized cross correlation matrix H, the stage at which each symbol can be decided, while preserving the maximum likelihood criteria, can be determined prior to execution of the M-algorithm. By applying some preprocessing, the complexity of the M-algorithm can be greatly reduced and performance will increase because this process prunes the decision tree leaving a reduced more valid set of hypotheses to prune using the conventional M-algorithm processing.

In one embodiment, the maximum likelihood requirements are relaxed to further reduce complexity by making decisions on symbols such that the signal to interference ratio (SIR) for each stage is greater than a predefined threshold τ, wherein decreasing this threshold τ has the benefit of further reducing complexity at the expense of potential performance degradation. This gives a well defined control that can be used to adjust and optimize the complexity versus the bit error rate (BER) profile for a given correlation structure. At the completion of this SIR decision process, the standard M-algorithm pruning takes over, keeping only the top M symbol hypotheses out of all remaining hypotheses.

FIGS. 3a-3d illustrate one example of how hypotheses are propagated through the decision tree using the M-algorithm with interference based pruning. As shown, using this approach reduces computational complexity over the conventional M-algorithm illustrated in FIGS. 2a-2d and with minimal degradation in performance.

In this example, Q=2, K=4, M=3, τ=15 dB and the magnitude of the unnormalized signal correlation matrix is defined as:

TABLE B $$|H| = \begin{bmatrix} 2.10 & 1.32 & 0.02 & 0.03 \\ 1.32 & 1.70 & 0.06 & 0.93 \\ 0.02 & 0.06 & 1.20 & 0.03 \\ 0.03 & 0.93 & 0.03 & 0.80 \end{bmatrix}$$

The stage by stage decision tree in FIGS. 3a-3d is based on the signal to interference (SIR) metric computed for each user at each stage such that if the SIR>τ, a decision is made on that users symbols. Referring to FIG. 3a along with the correlation matrix of Table B, and using the M-algorithm with interference based pruning, symbol b1 will be decided at stage 2 as the SIR metric for each user at stage 1 was less than 15 dB (τ). This has the effect of allowing more paths than the conventional M-algorithm to develop on the subset of paths that seem more likely based on correlation measures.

Referring to FIG. 3b, $b_3$ is decided at stage 3 and symbols $b_2$ and $b_4$ are decided at the conclusion of stage 4. The stage by stage decision tree in FIGS. 3a-3d based on the signal to interference (SIR) metric computed for each user at each stage shows that using this approach reduces computationally complexity over the conventional M-algorithm illustrated in FIGS. 2a-2d. Note, that the solid lines denote symbol hypotheses that survive and dotted lines denote symbol hypotheses that were tested but did not survive at each stage. The final resultant decision path 310 at stage 4 of FIG. 3d represents a suboptimal approach but with greater efficiency (less memory and fewer computations).

It is also noted that performance could improve with the more optimal pruning, shown by comparing FIGS. 2a-2d with FIGS. 3a-3d. Referring again to FIG. 2c and FIG. 2d, for the M-algorithm, symbol $b_2$ is decided at stage 3. However, there is no way to account for the fact that the corresponding signature waveform $s_2$ is highly correlated with signature waveform $s_4$ as seen in element $|h_{24}|$ of the correlation matrix of Table B. This high correlation means that the stage metric Φ4 computed at stage 4 is highly dependant on $b_2$. Ignoring this influence yields a suboptimal estimate for symbol $b_2$. The resulting path h11 is different than the ML decision tree path of FIG. 1 and FIG. 3d.

Referring again to FIG. 3c and FIG. 3d, using the M-algorithm with interference based pruning, decisions were made for symbols $b_1$ and $b_3$ earlier than they were using the conventional M-algorithm. Making these symbol decisions earlier means that less branches need to be pruned corresponding to the other users. In this example that meant symbol $b_2$ was not decided on until the completion of stage 4 resulting in an optimal estimate for that symbol. Therefore, in this example, complexity was decreased while overall performance was increased.

According to one embodiment, complexity is upper bounded by the pruning metric M (number of branches at each stage) and lower bounded by single user matched filter complexity.

Figure 4:
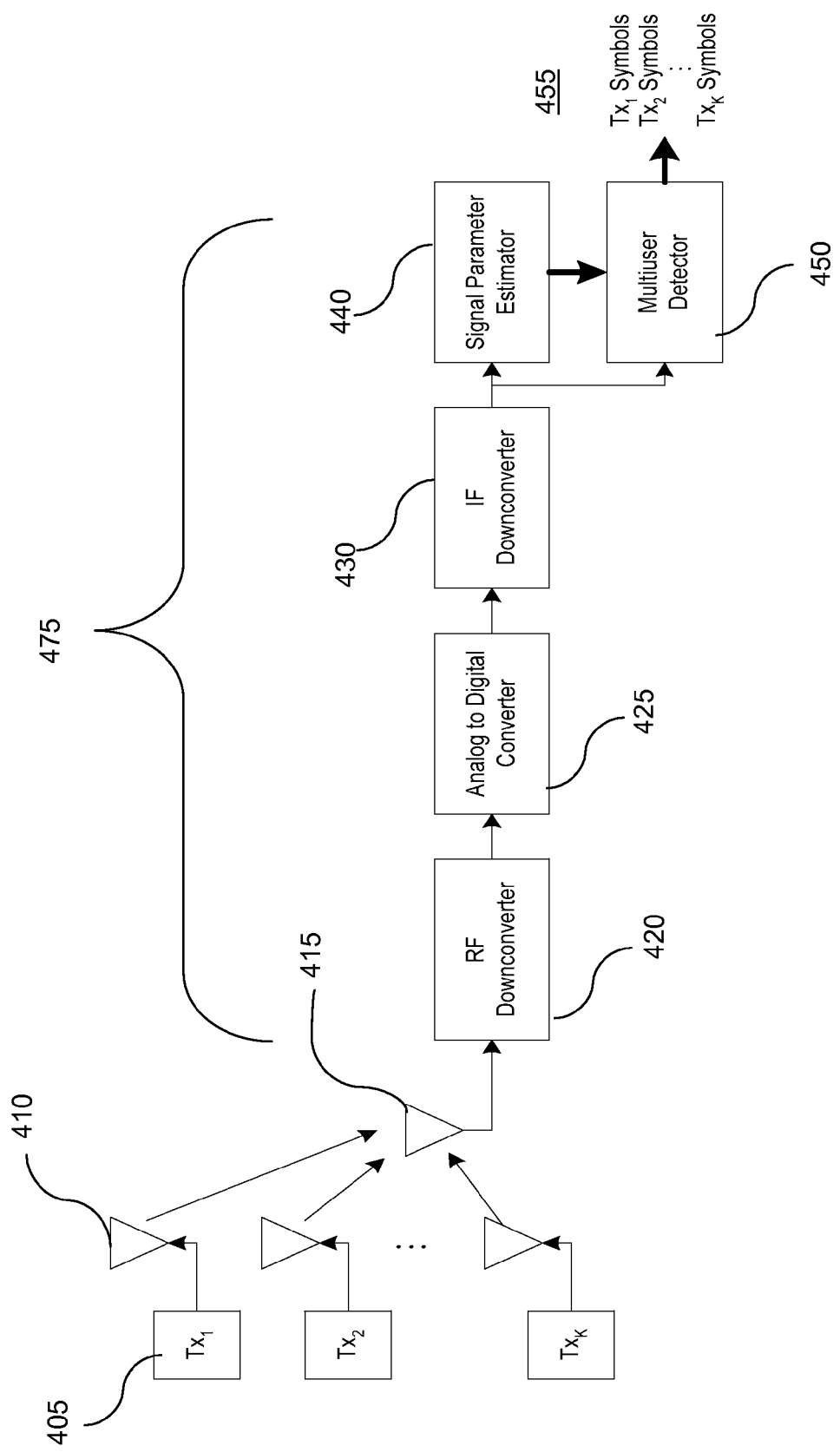
FIG. 4 is a top level system block diagram of a Communication System having a Multiuser Detection Receiver.

Referring to FIG. 4, a block diagram for a communications system is shown comprising a plurality of User Transmitter signals $Tx_1$ to $Tx_K$ 405 being transmitted by some transmitter antennas 410. Each User Transmitter signal is a digitally modulated signal such as phase shift keying (PSK) or quadrature amplitude modulation (QAM) and each one is transmitted in such a way that they all occupy the same frequency and time channel.

At the receiver 475, all interfering User Transmitter signals $Tx_1$ to $Tx_K$ 405 are received at the receiver antenna(s) 415.

In one embodiment, the MUD Receiver 475 has an analog front end that includes the receiving antenna 415, an RF downconverter 420, and analog-to-digital converter 425, and IF downconverter 430. Various amplifiers and filters (not shown) of the front end are well known in the art and may be included herein.

K signals from the User Transmitters $Tx_1$ to $Tx_K$ are received by the Antenna 415 as the sum of the signals from Transmitters $Tx_1$ to $Tx_K$ 405. The Antenna 415 is typically a singly polarized antenna although various other antennae are known in the art and can also be employed. The receiver could also include an array of antenna in which case the array of received signals is processed jointly.

The receiving antenna(s) 415 thus receives the interfering User Transmitted signals $Tx_1$ to $Tx_K$ 405, wherein the interference between signals can affect the ability to extract each User Transmitted signals $Tx_1$ to $Tx_K$. The RF Downconverter 420 lowers the operating frequency of the received signals which can then be processed by an analog-to-digital converter 425 that changes the analog signals to digital signals. The A/D converter 425 is sometimes implemented as a signal sampler that captures a snapshot of the sampled waveform. The optional IF downconverter 430 can be used to further lower the operating frequency of the digital signal stream.

The digital data stream is a complex baseband signal, r(n) also denoted in vector form as r, which contains information from all K co-channel interfering signals in the same frequency and time space and is input to the Multiuser Detector 450 and Parameter Estimator 440

The Parameter Estimator 440 supplies the Multiuser Detector 450 with the information needed to process the received signal vector r. The signature waveforms which are unique to each user, describe the transformation of each user's transmitted symbols as they propagate from transmission to reception. This includes pulse shape filtering and receiver filtering. Some multiuser detectors 450 may also require information about the location of the training sequence in each frame of data for synchronization, and they may also require information about the noise power in the received signal to make better estimates of the transmitted symbols for each user. The Parameter Estimator 440 may be configured to calculate such parameters, and operate with any Multiuser Detector 450.

A parameter estimation unit processes the various parameters for the received raw data. The parameter estimation module typically estimates such data as timing offsets, signal amplitudes, carrier phases, polarizations, channel transfer functions, coding rates, identification of active channels, as well as any other information required for multiuser detector processing. Parameter estimation units are known in the art, and a detailed description is available in published patent application U.S. 2002/0037061 A1 entitled "System for Parameter Estimation and Tracking of Interfering Digitally Modulated Signals", which is incorporated by reference. In this invention the parameter estimator provides an estimate of the signature waveform for each transmitted user. This signature waveform denoted in vector form as $s_k$ incorporates the relative time delay, phase offsets, carrier frequency offsets and amplitudes of each user in the system.

The Multiuser Detector 450 jointly demodulates the interfering digital signals, using information provided by the Parameter Estimator 440.

The outputs of the Parameter Estimator 440 are sent to the MUD 450, which also receives the complex baseband signal vector r, and produces separate streams of estimates for transmitter symbols 1 to transmitter K symbols for signal 1, signal 2, up to signal K which correspond to each of the K interfering signals sent by Transmitters $Tx_1$ to $Tx_K$ 405. The output of the MUD 455 is the $Tx_1$ to $Tx_K$ symbols 455. The system may further include additional post-MUD processing elements (not shown) adapted to receive the outputs of the MUD 450, such as frequency mismatch compensation modules, block error decoding modules, demultiplexing or depacketizing modules, and routing modules.

A MUD algorithm within a TurboMUD system determines discrete estimates of the transmitted channel symbols, with the estimates then provided to a bank of single-user decoders (one decoder for each user) to recover the input bit streams of all transmitted signals. There are two general types of multiuser detectors within the TurboMUD system that are possible, namely those that provide hard outputs, which are discrete values, and those that provide soft outputs, which indicate both the discrete estimate and the probability that the estimate is correct. Typically, single-user decoders operating on hard values or discrete integers, have unacceptable error rates when there is a large amount of interference. The reason is that discrete integers do not provide adequate confidence values on which the single-user decoder can operate. These decoders operate better on so-called soft inputs in which confidence values can range from −1 to 1, such as for instance 0.75 as opposed to being either −1 or +1.

To provide soft values that can then be utilized by a single-user decoder, the multi-user detector generates these soft values. However the processing typically takes an inordinate amount of time. Since single-user decoders operate best on soft values, it is often times the case that the computational complexity for a robust MUD capable of generating these soft values makes it impossible to get a real-time result.

Figure 5:
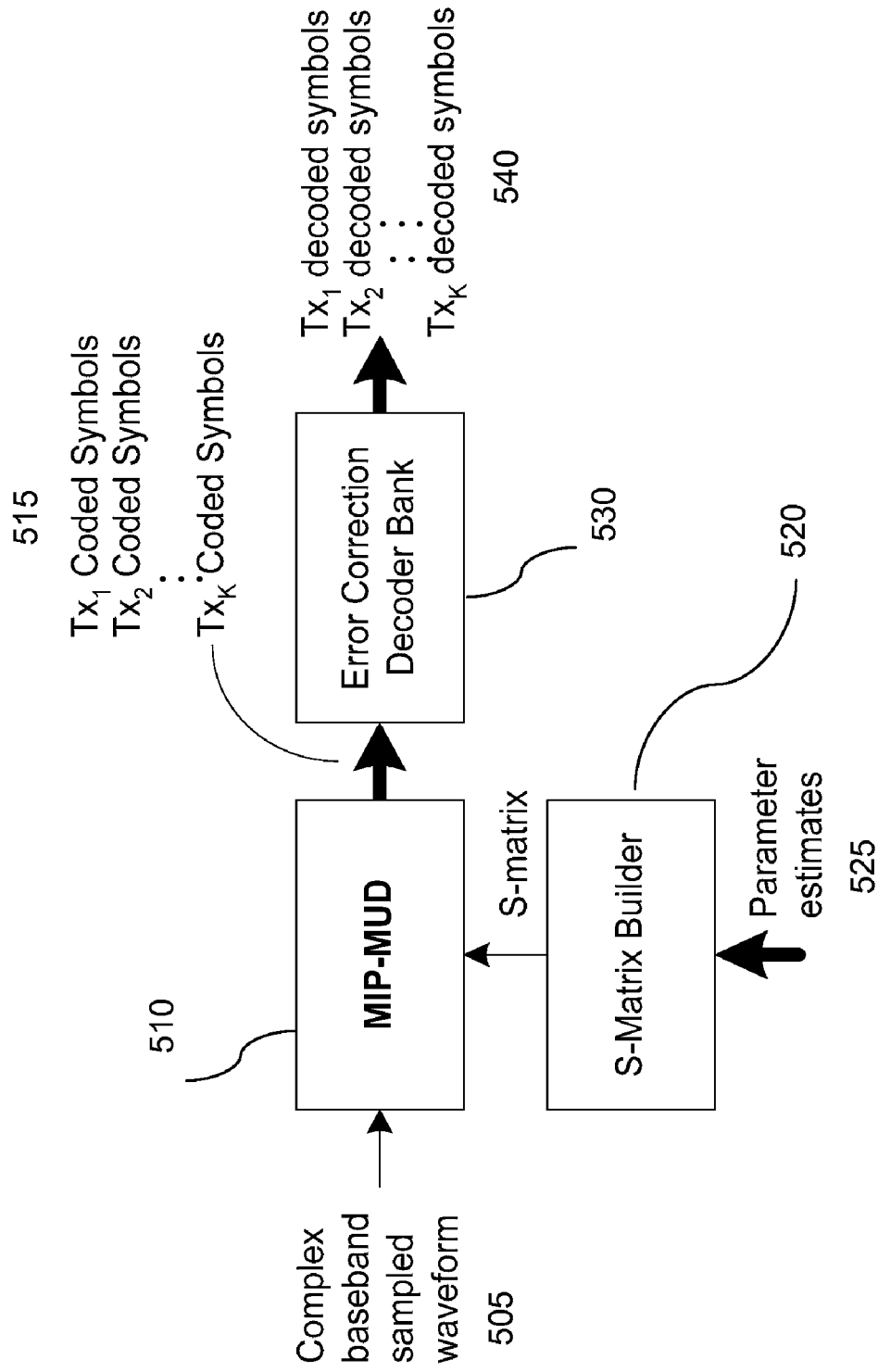
FIG. 5 is a block diagram of the M-Algorithm Interference Pruning-Multiuser Detection (MIP-MUD) configured in accordance with one embodiment of the present invention.

Referring to FIG. 5, a partial perspective diagram of the interference pruning for the multiuser detectors according to one embodiment is depicted. The complex baseband sampled waveform 505 is input to M-algorithm Interference Pruning (MIP) MUD 510. In this embodiment, the parameter estimates 525 are pre-processed by the S-Matrix Builder 520 to create a single matrix S where each column $s_k$ contains the signature waveform vector for symbol k. Note, as defined herein for convenience K is the number of symbols being jointly demodulated by the MIP MUD 510 and k as the index for each symbol. In general, these symbols can correspond to K unique users or to a combination of symbols from several users such that the total number of symbols combined across all users is K.

The coded symbols 515 from the MIP MUD 510 are then processed by a decoder bank 530 to produce the decoded symbols 540. There are numerous other references, including those incorporated by reference that detail various MUD processing, and the present invention of the MIP-MUD can be integrated therewith.

Figure 6:
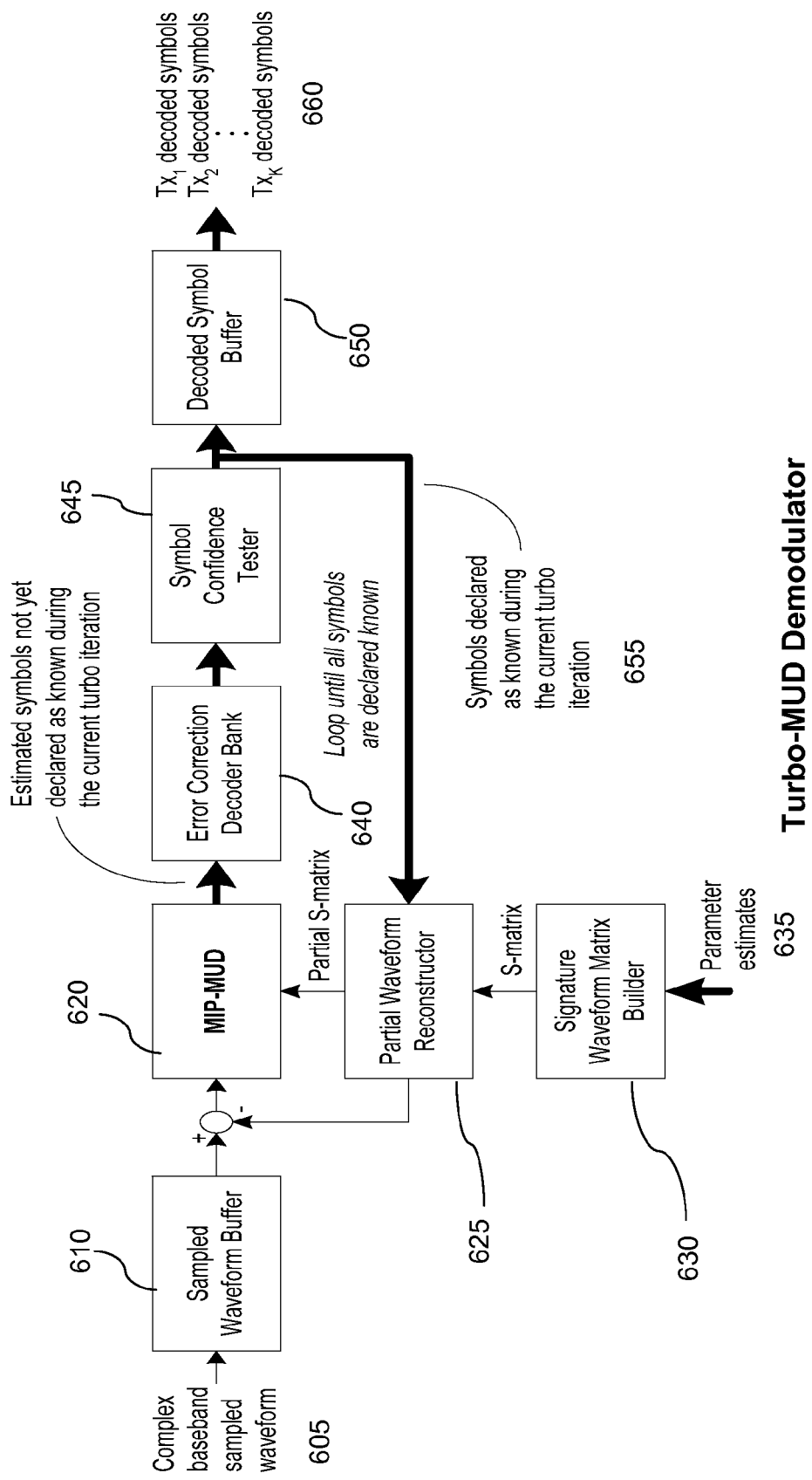
FIG. 6 shows the pruning system for a turbo MUD configured in accordance with one embodiment of the present invention.

Referring to FIG. 6, Turbo MUD processing is an iterative processing method that is also within the scope of the invention. In this case the complex basedband sampled waveform 605 is stored in a sampled waveform buffer 620. During the first iteration of the Turbo MUD process, this buffered waveform is passed to the MIP-MUD 620 along with the S-Matrix. The output of the MIP-MUD 620 is a set of channel symbol estimates for each user. These symbol estimates are passed to a bank of error correction decoders 640. The outputs of the decoder bank 640 are a set of soft symbol estimates for each user. These estimated symbols are tested by a symbol confidence tester 645 to determine which ones can be considered correctly demodulated. Those symbols from each user that are considered correctly demodulated 655 are stored in a decoded symbol buffer 650.

Those same symbols are also passed to the partial waveform reconstructor 625, along with the original S-Matrix. The partial waveform reconstructor 625 then reconstructs a partial waveform using those symbols that passed the symbol confidence test and their corresponding signature vector $s_k$. This partial reconstructed waveform vector is then subtracted from the buffered waveform vector r to remove those symbols from the signal. The partial waveform estimator also passes a partial S-matrix to the MIP-MUD 620. This partial S-Matrix contains signature waveforms from all symbols that have not yet passed the symbol confidence test. This process iterates until all the symbols pass the symbol confidence test or until the maximum number of turbo iterations is reached. Once complete the decoded symbols for each user 660 are output from the Turbo-MUD demodulator.

Figure 7A:
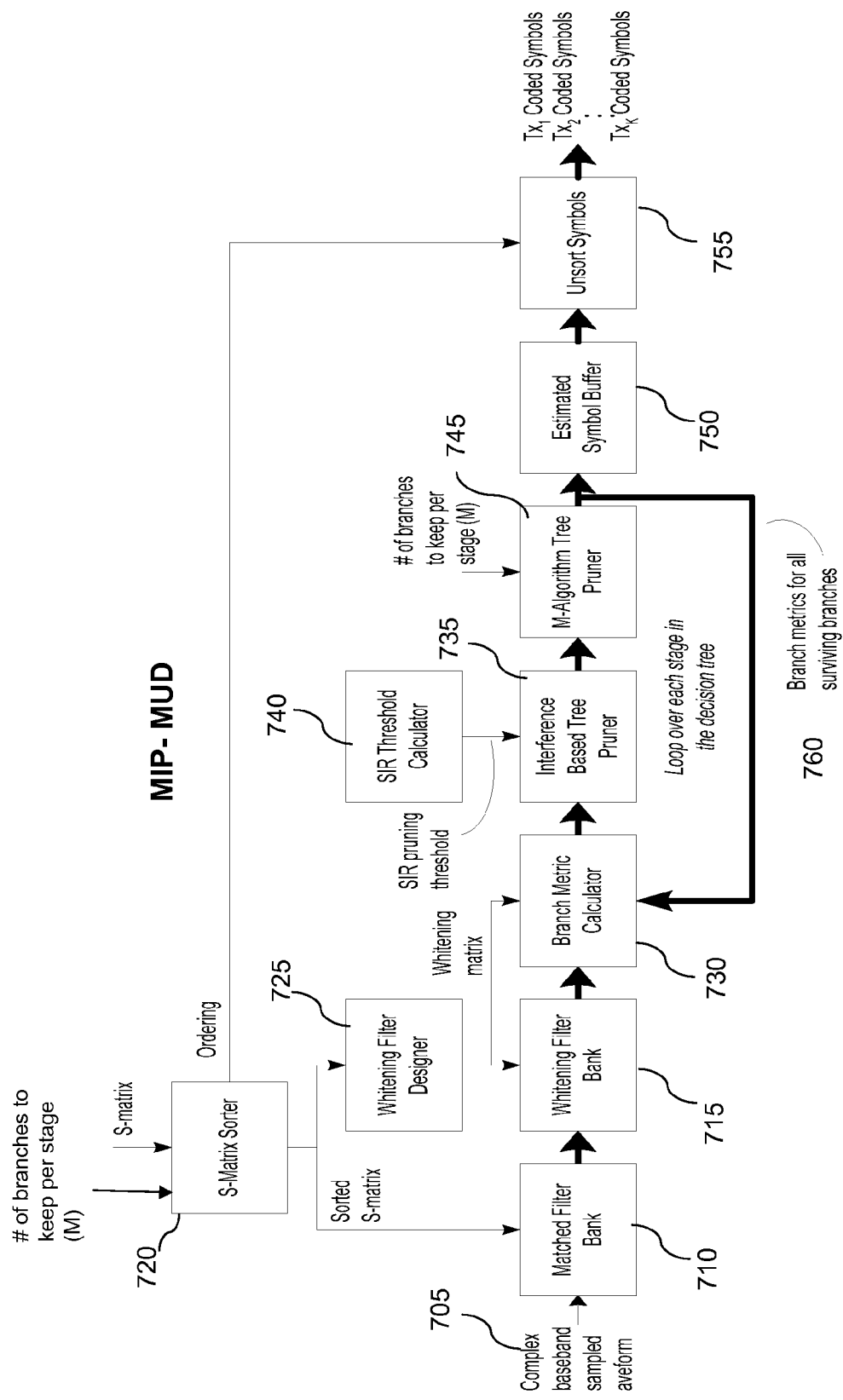
FIG. 7a is a block diagram of one embodiment of the M-Algorithm with interference based pruning invention, denoted as MIP-MUD in accordance with one embodiment of the invention.
Figure 7B:
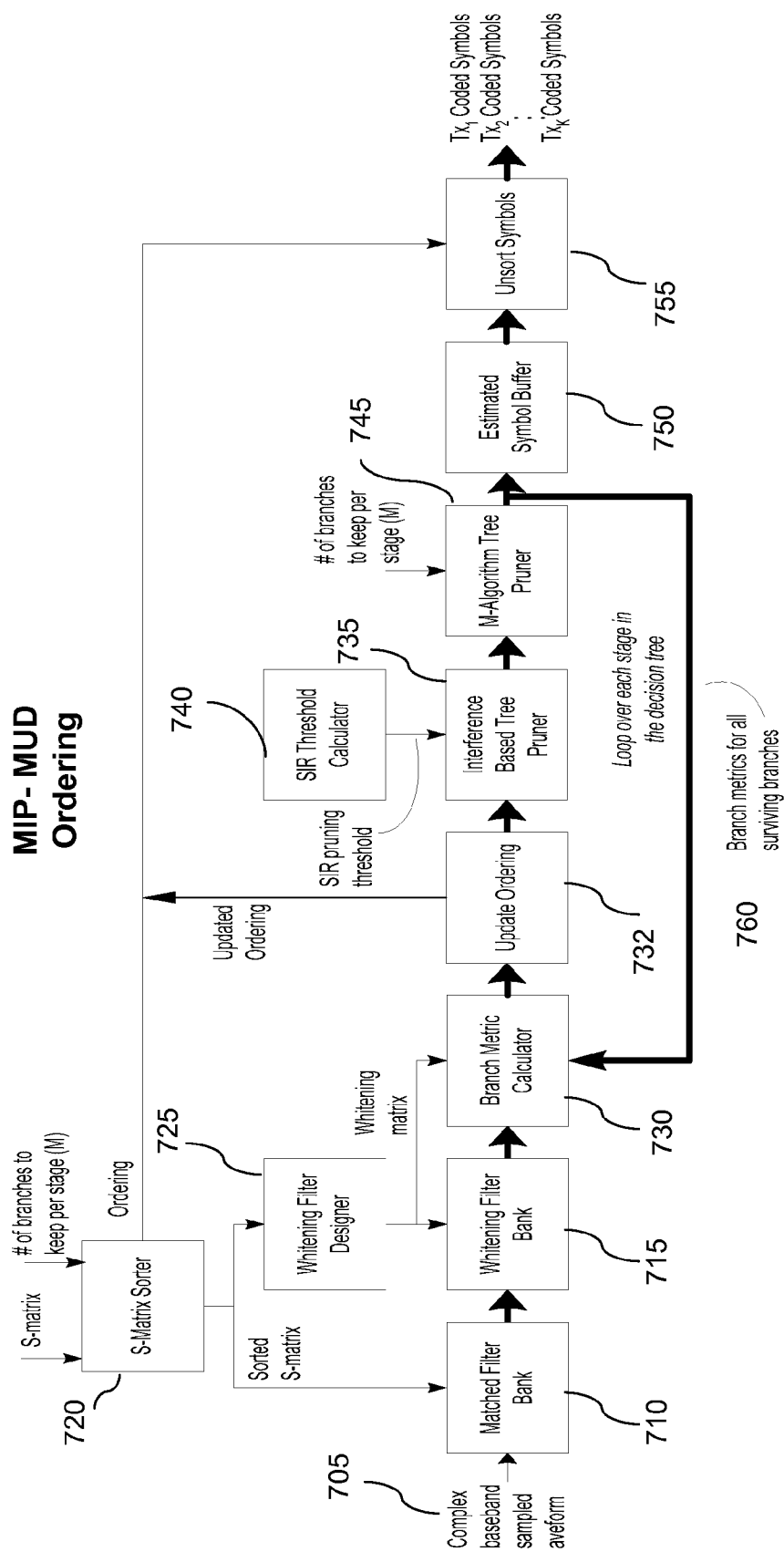
FIG. 7b is a block diagram of an alternate embodiment of the M-Algorithm with interference based pruning, also denoted as MIP-MUD, where the order of symbols in the decision tree is updated each stage.

Referring to FIGS. 7a and 7b, two embodiments of the present invention are depicted, both of which are applicable to a conventional M-algorithm multiuser detector such as defined in U.S. application Ser. No. 10/423,655 entitled "Deferred Decorrelating Decision-Feedback Detector for Supersaturated Communications" filed Apr. 25, 2003. The embodiments shown in FIGS. 7a and 7b describe an M-algorithm multiuser detector that includes an additional processing step which is performed as each stage in the decision tree. This processing step includes pruning the decision tree based on signal-to-interference ratios. This process is implemented by the SIR threshold calculator 740 and the Interference Based Tree Pruner 735 which will be described in detail herein. The benefit of this additional processing step is to further reduce processing time and improved system performance by making decisions on symbols or groups of symbols that do not interfere "much" with remaining symbols in the decision tree. In addition, two symbol ordering methods are described that enable much more efficient tree pruning. One, is implemented in the embodiment in FIG. 7a, and defined in the flow chart in FIG. 8, and the other is implemented in the embodiment in FIG. 7b and described in the flow chart in FIG. 9.

As described in FIGS. 7a and 7b, a complex baseband sampled waveform 705 is input into the MIP-MUD and processed by a bank of matched filters 710 and whitening filters 715 respectively to produce a K×1 vector of whitened match filter outputs denoted as z. This filtering process is defined mathematically as $z=WS^H r$ where r is the N×1 complex baseband sampled waveform, S is the N×K sorted S-matrix and W is the K×K whitening filter matrix.

The whitened matched filter outputs are then processed by the branch metric calculator 730. The branch metric calculator 730 determines the metric or weight associated with each branch in the decision tree and is updated at each stage in the decision tree.

The outputs of the branch metric calculator 730 feed the interference based tree pruner 735 which uses the SIR pruning threshold as determined by the SIR threshold calculator 740 to prune off those branches as detailed herein.

The interference pruned data is then processed by the multiuser detection unit 745, namely an M-algorithm tree pruner, which outputs a bit (or symbol) stream associated with each interfering signal present on the channel for one data block. The number of branches to keep per stage (M) can be a pre-defined value or adjustable depending upon the design criteria. According to one embodiment, M is a user definable variable.

The MUD detector 745 passes the branch metrics for all surviving branches back to the branch metric calculator in an iterative loop 760 for each stage in the decision tree. The branch metric calculator 730 re-calculates the branch metrics for the surviving or non-pruned branches and processing continues until the last stage in the decision tree is reached. The data is then passed to an estimated symbol buffer 750. The output from the symbol buffer 750 is the input to the unsort symbol module 755 that finally outputs the coded symbols.

The sorted S-matrix, generated by the S-Matrix Sorter 720 reorders the columns of the S-Matrix to correspond with the order in which each symbol will be demodulated in the decision tree. This is noteworthy when implementing any tree pruning algorithm like the M-algorithm because the order of the symbols in the tree impacts bit-error rate performance. This is described in detail by Varanasi in "*Decision Feedback Multiuser Detection: A Systematic Approach*", IEEE Transactions on Information Theory, vol. 45, January 1999. In the case for a decision feedback detector, which is an M-algorithm with M=1, it is shown that the optimal ordering is to sort the symbols such that the ones with the highest SIR are at the lowest stages of the decision tree.

In the present invention an ordering method is described in the flow chart in FIG. 8. First, the stage p in the decision tree that the M-algorithm pruning will begin is calculated as:

$$p=\text{floor}(1+\log M/\log Q)$$

where M is the pruning metric and Q is the modulation order (i.e. Q=2 for BPSK and 4 for QPSK). Next, using the unnormalized correlation matrix H where $H=S^H S$, The set {V} of p symbols with the highest group SIR (GSIR) is computed as $$GSIR_V = 10\log\left(\frac{\sum_{i\in V}|h_{ii}|^2}{\sum_{k\in V}\sum_{n\in V^c}|h_{kn}|^2}\right)$$

To clarify, $GSIR_V$ is computed for all combinations of p symbols to find the combination or set V that has the highest group SIR. This group of symbols is placed at the first p stages of the decision tree by sorting the S-matrix such that the corresponding signature vectors are in the left most columns of the S-matrix. The other remaining symbols are then sorted based on individual SIR, loudest to weakest. In this case, the SIR of the next loudest user is calculated based on the set of remaining users that have not been ordered yet. The reason this method has value is because the group of users with the highest group SIR does not necessarily correspond to the p users with the highest total individual SIR. And, because the decision tree branch metric computed at each stage only include sinformation from symbols in prior stages, its beneficial to put the groups of symbols with the least interference first to minimize system bit-error-rate.

One method to implement the whitening filter designer 725 is to take the Choleski factorization of the inverse of the diagonally weighted unnormalized correlation matrix. This is defined mathematically as:

$$W = \text{chol}([H+\sigma^2 I]^{-1})$$

Where $\sigma^2$ is the diagonal weight which is often the noise power, but could be any predefined constant.

Once the whitened matched filter outputs z are computed they are fed to a branch metric calculator 730 which computes a metric that in one embodiment consists of the Euclidean distance between the output of one of the whitening filters and the hypothesized mean signal energy based on the bit hypothesis for the user in question and the mean signal energy corresponding to the hypotheses selected for users previously tested. The metric at each node of the decision tree includes the accumulation of metrics corresponding to previous decisions. This metric, computed at each stage in the decision tree for all symbol hypothesis sets corresponding to the remaining branches in the decision tree is defined mathematically as $$\Phi_k(b_1,\ldots,b_k) = \Omega_1(b_1) + \Omega_2(b_1,b_2) + \ldots + \Omega_k(b_1,\ldots,b_k)$$

where $$\Omega_k(b_1,\ldots,b_k) = \left|z_k - \sum_{n=1}^{k} f_{kn}b_n\right|^2$$

where $z_k$ denote the whitened match filter output for symbol k, and $f_{kn}$ is the k,n element of matrix F where $F=W^{-1}$.

The SIR threshold calculator 740 calculates the threshold for determining which symbols can be pruned based on their SIR, and one embodiment for calculating this threshold is defined in FIG. 10. In this figure Q( ) denotes the complimentary error function.

The interference based tree pruner 735 uses the SIR pruning threshold to determining which symbols can be pruned. FIG. 11a and lib described two methods for performing this interference based tree pruning.

In FIG. 11a the pruning method requires that the signal to interference ratio (SIR) for each symbol per stage be greater than a predefined SIR pruning threshold τ, as defined by the equation below. This SIR for symbol i evaluated at stage j, for, j≧i is defined as:

$$SIR_{ij} = 20\log\left(\frac{|h_{ii}|}{\sqrt{\sum_{n=j}^{K}|h_{in}|^2}}\right)$$

where $h_{ij}$ can denote either the ij elements of the unnormalized correlation matrix H or the ij elements of the inverse whitening matrix F where $F=W^{-1}$. There are other SIR metrics that can be used for making pruning decisions. One such metric would be to use:

$$SIR_{ik} = 20\log\left(\frac{|h_{ii}|}{\sqrt{\sum_{n\in D}|h_{in}|^2}}\right)$$

where $\mathcal{D}$ is the set of users whose symbols have not been decided. These give well defined controls that can be used to adjust and optimize the complexity versus bit error rate (BER) profile for a given correlation structure.

According to one embodiment, all symbols that meet this pruning threshold are pruned as follows:

First, define a set of symbols $P \in \{b_j\}_{j=1}^{k}$ that contains all the symbols whose value was decided prior to stage k.

Next, determine the indices of all symbols that can be decided in the current stage, i.e. $i \in \{1, 2, \ldots, k\}$ such that $b_i \in P$ and $SIR_{ik} \geq \tau$.

Figure 11B:
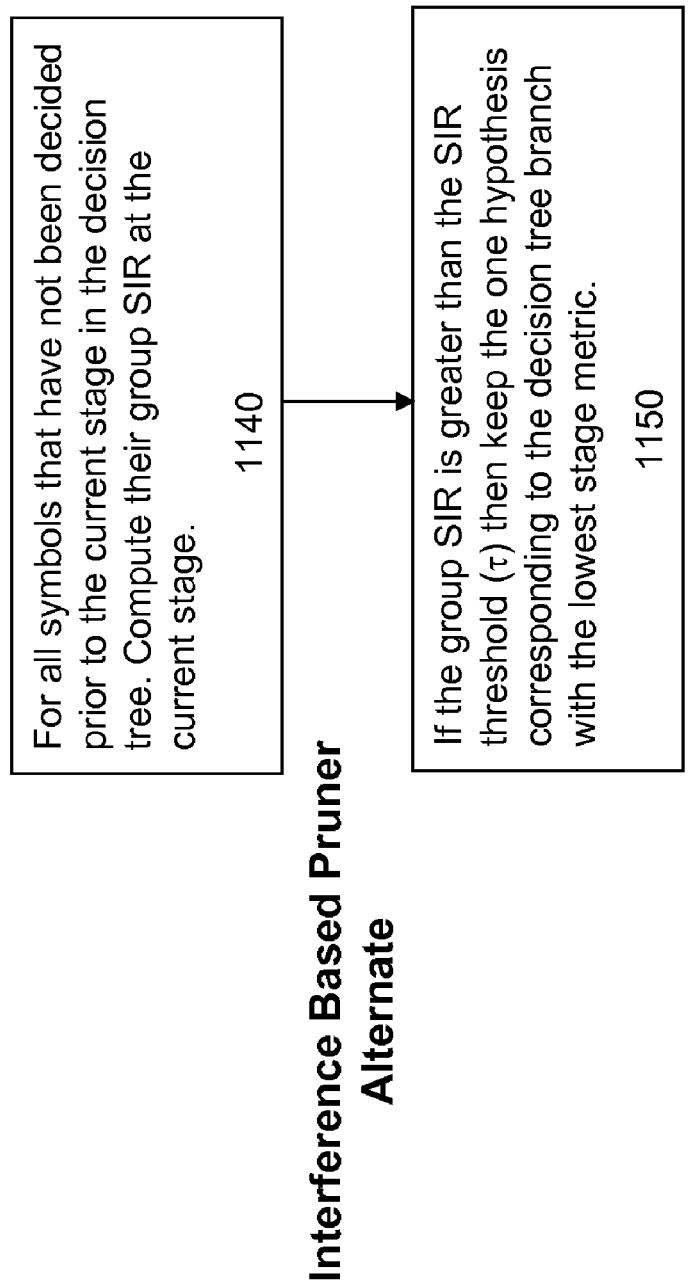
FIG. 11b is a flow chart describing an alternate method for determining which symbols in the decision tree can be decided on during each stage in accordance with one embodiment of the invention.

Finally, solve for the corresponding symbol set C whose elements contain all symbols to be decided in the current stage. This is accomplished by summing over the stage metrics $\Phi_k$ for all combinations of symbols that must be estimated in future stages as follows:

$$\hat{C} = \arg\min_{C \in \{\pm 1\}^{N_C}} \sum_{l=1}^{L} \Phi_k(P, C, F_l)$$

where $F_l$ is the set containing the $l^{th}$ hypothesis of all remaining L symbols to be estimated in future stages such that $F_l \in \{\{b_j\}_{j=1}^{k} \notin \{P,C\}\}$ An alternate pruning method is defined in FIG. 11b. This method includes computing the group SIR for all symbols included in the current and all prior stages that have not yet been decided on. In this case the group SIR is computed as $$GSIR_V = 10\log\left(\frac{\sum_{k\in V}|h_{ii}|^2}{\sum_{k\in V}\sum_{n\in V^c}|h_{kn}|^2}\right)$$

where V is the set of all symbols not yet decided on that are included in the current and all prior stage metrics. If this SIR is above the SIR pruning threshold then it means that all previous symbols will not influence symbols decisions for symbols further in the tree and therefore all but one branch is pruned and the branch that remains corresponds to the branch with the lowest metric.

At the completion of this interference based pruning process, the standard M-algorithm pruning takes over, keeping only the top M symbol hypotheses out of all remaining hypotheses.

The computational complexity denoted $C_{MCP}$ according to one embodiment of this invention for an M-algorithm with interference based pruning is bound by:

$$\alpha QK \leq C_{MCP} \leq C_M$$

where the lower complexity bound is achieved when $SIR_{ij} \geq \tau$ for all symbols at all stages and the upper complexity bound is achieved when $SIR_{iK} < \tau$ for all symbols. In the later case, the algorithm reduces to the conventional M-algorithm whose complexity $C_M$ is based on the size of M. At the completion of the SIR decision process, the M-Algorithm pruning resumes but only with the top M symbol hypotheses. Interference based pruning reduces the complexity of the M-algorithm processing and also tends to increase performance because it prunes the decision tree leaving a reduced more valid set of hypotheses to prune using the conventional M-algorithm processing.

Figure 9:
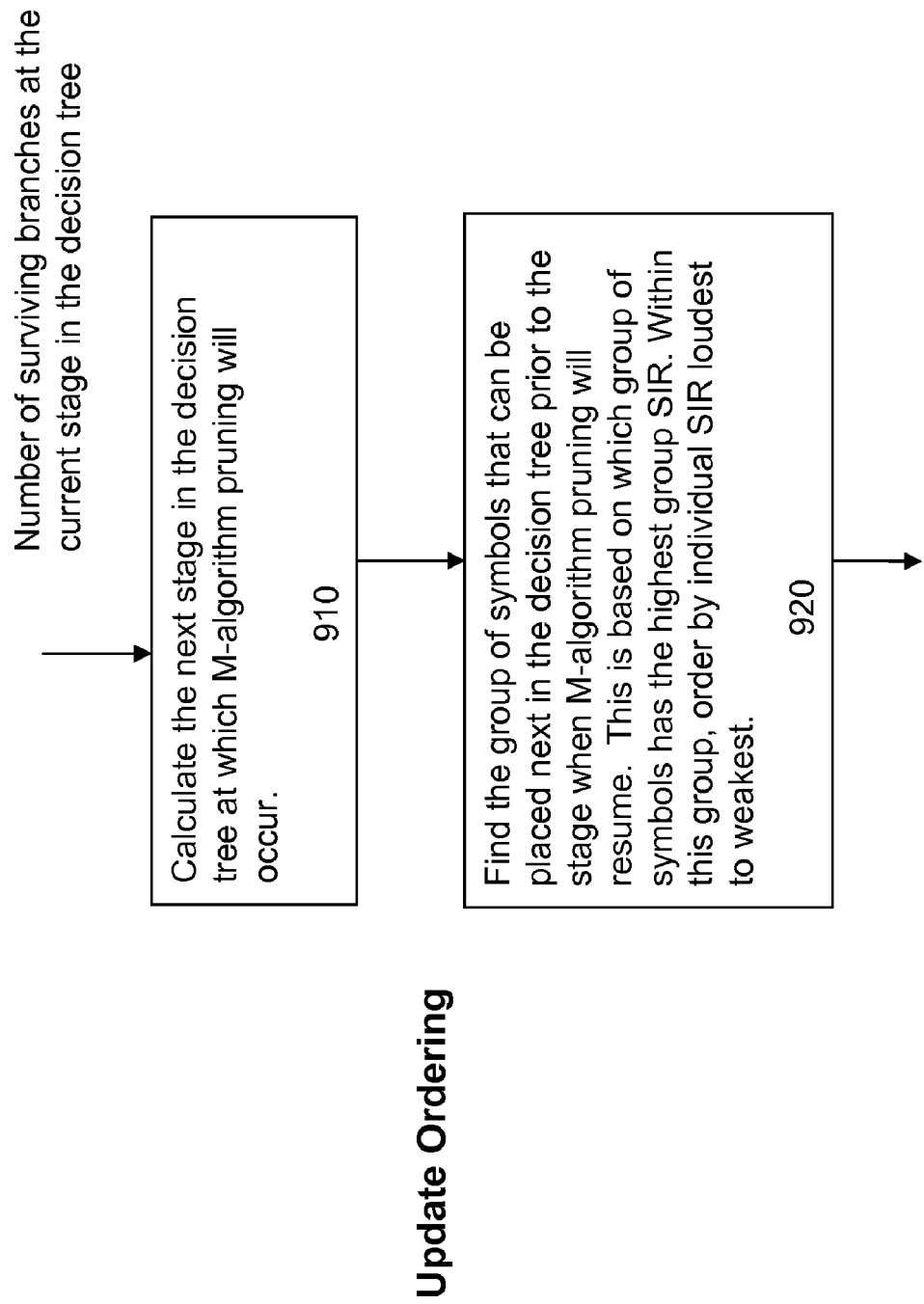
FIG. 9 is a flow chart used for determining how to sort the remaining symbols in the decision tree at each stage in accordance with one embodiment of the invention.

Implicit in the pruning algorithms defined herein is a presumed order of the users to be decoded. This is depicted by the S-Matrix sorter 720. The order of decoding can have a significant impact on the performance, wherein a typical M-algorithm will choose an ordering before processing begins. However, one embodiment of the present invention chooses the ordering at each stage in the tree. This is accomplished by incorporating an update ordering module 732 sorting box in the feedback loop. In FIG. 9 a method for incorporating symbol ordering at each stage in the decision tree is described. In this embodiment, the order of users to be added to the tree will be calculated at each stage. The order is determined only when necessary to complete a stage. Therefore, at each stage the number of users to be added to the tree is calculated based on the allowed number of surviving paths and the modulation order of the users 910. The algorithm proceeds by first determining the number of users, |V|, that must be added to the tree to get at least M paths, where V is the set of user indexes. Next, all of the users are searched in groups of |V| for the group that has the best group SIR metric. The method of computing the group SIR (GSIR) can vary but one way is:

$$GSIR_V = 10\log\left(\frac{\sum_{i \in V} |h_{ii}|^2}{\sum_{k \in V} \sum_{n \in V^c} |h_{kn}|^2}\right)$$

This is one way of finding the generalized SIR for the group V. It is the ratio of all users' powers in V to the sum of all cross-correlations of users in V with users who have not already been placed in the tree. The group with the highest GSIR is placed in the tree next based on the individual SIR's 920. Finally, the MIP-MUD proceeds as described herein until more users must be placed in the tree.

One embodiment of the present invention is an improvement to the M-algorithm in which the interference structure based on the signal correlation matrix used during the optimization process to aid in selecting a better subset of hypotheses to test. This approach has the benefit of reducing computational complexity and improving performance over the existing M-algorithm.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

Various efficient decision tree search strategies can be employed according to the teachings herein. In addition, while the M-algorithm is one approach that restricts the number of hypotheses at each stage to a fixed number, the T-algorithm is similar in nature to the M-algorithm, however, it restricts the number of hypotheses by comparing the accrued metric to a threshold. Variation of this approach and other efficient approaches to decision tree searches will be apparent in light of this disclosure.

There are numerous alternative embodiments for the interference pruning receiver configured in accordance with the principles of the present invention, as will be apparent in light of this disclosure. For example, the MUD conforms to various Turbo MUD designs and allows different combinations for the MUD core and error correction decoder. The MUD core can comprise MMSE MUD, windowed optimum MUD as well as various M-algorithm implementations. In addition, the convolutional error correction decoder in the turbo loop can comprise soft output Viterbi or soft output BCJR among others. Commonly assigned U.S. Pat. No. 6,981,203 entitled "Method and Apparatus for Random Shuffled Turbo Multiuser Detector" and U.S. Pat. No. 6,704,376 entitled Power and Confidence Ordered Low Complexity Soft TurboMUD with Voting System" represents additional alternative topologies that can utilize the present invention and are incorporated by reference herein.

While the discussion herein illustrates wireless communication applications, the principles of the present invention are equally applicable to wired cable systems and local area networks, read/write operations of a disc drive or other storage devices, satellite communications, and any application that benefits from manipulating digital data from among many multiple sources.

Embodiments of the invention may be implemented in software, hardware, firmware, or any combination thereof. For instance, the parameter estimation and MUD modules may be implemented in a set of instructions executing on a digital signal processor or other suitable processing environment. Alternatively, the modules can be implemented in silicon (e.g., ASIC, FPGA, or other system-on-a chip designs).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A multiuser detector system with correlation based pruning, comprising:

a digital signal processor upon which is disposed;

a parameter estimation module adapted to receive complex signals, and to produce estimated signature waveforms for each of K co-channel interfering signals;

an S-matrix module forming an S-Matrix from said estimated signature waveforms; and a multiuser detector module processing said S-Matrix of said estimated signature waveforms with an unnormalized cross correlation matrix, and producing a more valid set of hypotheses for pruning with an M-algorithm.

2. The system of claim 1 wherein the multiuser detector module computes a signal to interference ratio (SIR) for each symbol per stage, and wherein a decision is made at each stage if the SIR is greater than a predefined threshold ($\tau$).

3. The system of claim 2 wherein the SIR is calculated for each symbol i at stage j, for j≧i by at least one of:

$$SIR_{ij} = 20\log\left(\frac{|h_{ii}|}{\sqrt{\sum_{n=j}^{K}|h_{in}|^2}}\right) \text{ and } SIR_{ik} = 20\log\left(\frac{|h_{ii}|}{\sqrt{\sum_{n\in D}|h_{in}|^2}}\right).$$

4. The system of claim 2 wherein the predefined threshold ($\tau$) is calculated as follows:

10 $\text{Log}_{10}(Q^{-1}(BER))$, BER is the desired bit error rate and $\tau$ is the SIR threshold in dB.

5. The system of claim 2 wherein $\tau$ is used to control a computational complexity (CMCP), wherein said CMCP is bound by: $\alpha QK \leq C_{MCP} \leq C_M$, wherein $C_M$ is the computational complexity of the M algorithm, $\alpha$ is the computational complexity of the filter, Q is the size of the symbol alphabet, and K is the number of users.

6. The system of claim 1 further comprising a front end whitening filter to pre-whiten said complex signals.

7. The system of claim 6 wherein said front end further comprises:
   a matched filter bank adapted to prewhiten said complex signals, thereby partially decoupling users from multiple access interference; and
   a whitener designer module operatively coupled to the parameter estimator, and adapted to develop a model of each of said complex signals based on parameter estimates, and to compute a whitening filter bank that whitens filtered data output by the matched filter bank.

8. The system of claim 1 wherein said multiuser detector module outputs a set of coded symbols and further comprising an error correction decoder bank processing said set of coded symbols.

9. The system of claim 1 wherein said multiuser detector module comprises a branch metric calculator, a signal to interference (SIR) threshold calculator, and a tree pruner.

10. The system of claim 1 wherein the complex signals provided to the multiuser detector module are buffered by a sampled waveform buffer.

11. The system of claim 1 wherein the multiuser detector module is a turbo MUD adapted to provide estimates of individual symbols for each of the K co-channel interfering signals, wherein the estimates are iteratively applied in a feedback loop until a pre-defined condition is satisfied.

12. The system according to claim 1 wherein said digital signal processor is selected from the group of digital signal processors consisting of field programmable gate arrays, and application specific integrated circuits.

13. A method for S-Matrix ordering for a decision tree comprising:
   determining with a digital signal processor a stage in said decision tree for pruning;
   using an unnormalized correlation matrix on said digital signal processor, determining a group of symbols with a highest signal to interference ratio (SIR);
   placing said group with said highest SIR at a bottom of said decision tree; and
   ordering remaining symbols by individual SIR with said digital signal processor.

14. The method of claim 13 further comprising re-ordering the group of symbols by an individual SIR from loudest to weakest.

15. The method of claim 13 wherein a size of said group corresponds to said stage for pruning in an M algorithm.

16. The method of claim 13 wherein said ordering of the remaining symbols by individual SIR is from loudest to weakest such that a weakest symbol is in a last stage.

17. The method of claim 13 further comprising calculating a next stage for pruning for a number of surviving branches at a current stage.

18. The method of claim 13 further comprising locating a next group of symbols prior to pruning.

19. A method for correlation based pruning for a set of stages 1-k, comprising:
   defining with a processor a set of symbols defined by $P\epsilon\{b_j\}_{j=1}^{k}$ containing symbols whose value was decided prior to stage k;
   in a current stage, determining, with said processor, indices of all current stage symbols;
   solving, with said processor, for a corresponding symbol set C whose elements contain all symbols to be decided in the current stage; and
   pruning, with said processor, using the M-algorithm pruning and keeping only top M symbol hypotheses out of all remaining hypotheses wherein said top M symbol hypotheses are dependent on the set of remaining symbols with the highest signal to interference ratios ($SIR_{ik}$).

20. The method of claim 19 wherein determining indices is defined by $i\epsilon\{1, 2, \ldots, k\}$ such that $b_i \notin \tilde{P}$ and $SIR_{ik} \geq \tau$.

21. The method of claim 19 wherein solving is accomplished by summing over the stage metrics $\Phi_k$ for all combinations of symbols that must be estimated in future stages as follows:

$$\hat{C} = \arg\min_{C\in\{\pm1\}^{N_C}} \sum_{l=1}^{L} \Phi_k(P, C, F_l)$$

where $F_l$ is the set containing the $l^{th}$ hypothesis of all remaining L symbols to be estimated in future stages such that $F_l\epsilon\{\{b_j\}_{j=1}^{k}\notin\{P,C\}\}$.

* * * * *